March 10, 1970     D. G. HARDING     3,499,500
STRAIN-GAUGE WEIGHING APPARATUS FOR VEHICLE SUPPORT STRUCTURE
Filed Feb. 29, 1968
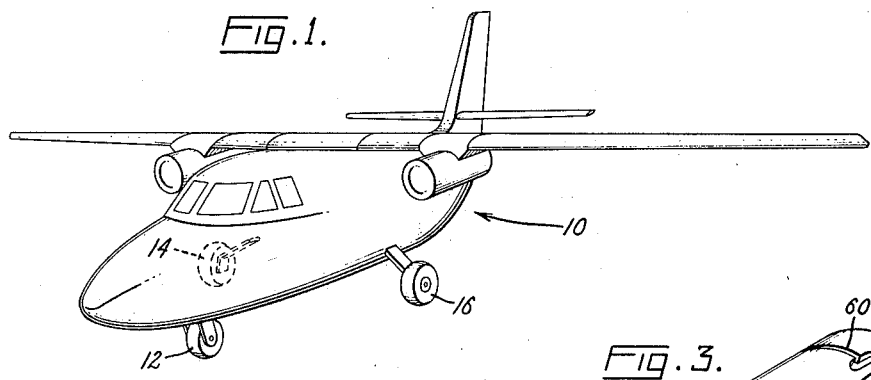
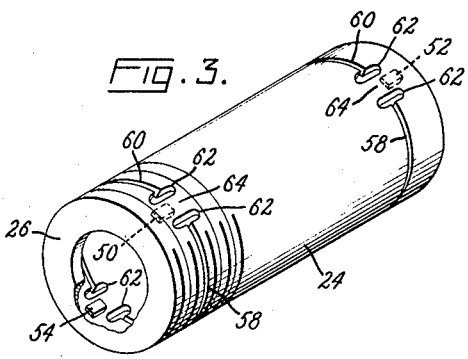
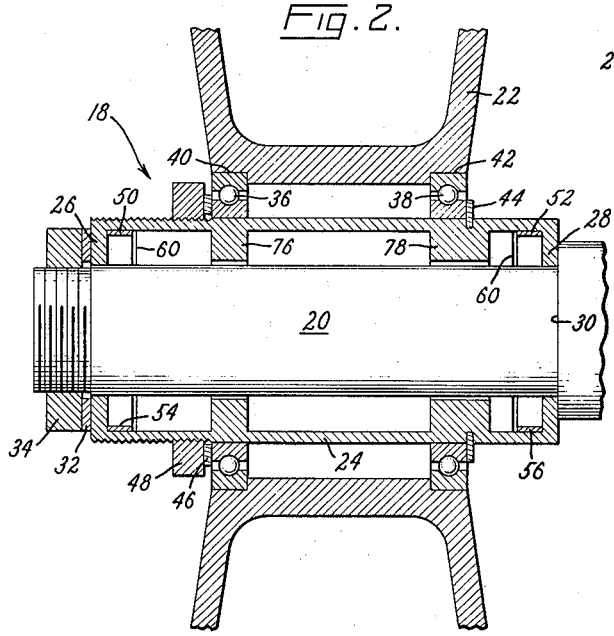
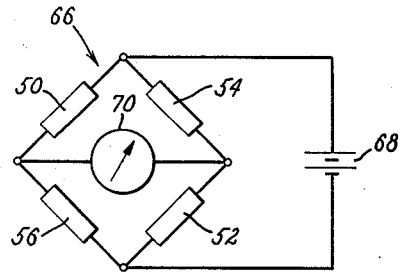
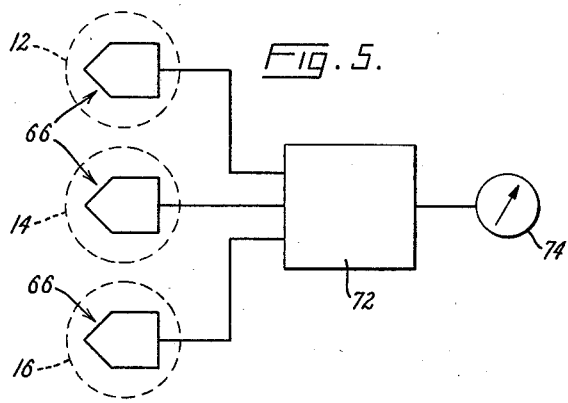
INVENTOR:
David G. Harding,
BY
ATTORNEY United States Patent Office 3,499,500
Patented Mar. 10, 1970

3,499,500
STRAIN-GAUGE WEIGHING APPARATUS FOR VEHICLE SUPPORT STRUCTURE
David G. Harding, Brookhaven, Pa., assignor to The Boeing Company, Seattle, Wash., a corporation of Delaware
Filed Feb. 29, 1968, Ser. No. 709,402
Int. Cl. G01g 3/14, 19/07, 19/12
U.S. Cl. 177—136    11 Claims

ABSTRACT OF THE DISCLOSURE

Apparatus for measuring the weight of a vehicle in which a flexural member supports the entire weight borne by a supporting structure. A Wheatstone bridge network of strain gauges mounted on the flexural member detects the presence of the weight and a calibrated meter is responsive to a signal from the network for indicating the weight of the vehicle.

---

This invention relates generally to weight measuring apparatus and specifically to improved apparatus for measuring the weight of a vehicle.

In order for a vehicle to achieve optimum performance and safety, it is important for the operator of the vehicle to be advised of its weight. This is particularly true in the instance of commercial vehicles such as aircraft which, in addition to performance and safety considerations, are required to operate within strict governmental regulations. In the past, it has been necessary to closely monitor the unloading of cargo or other payload onto the aircraft. This was a tedious and time-consuming procedure which required knowledge of the weights of individual items so that they could be manually recorded to arrive at the total weight of the aircraft. Such a manual procedure became even more difficult when it was necessary to make adjustments for fuel expended and for items unloaded and replaced with other items at intermediate destinations.

More recently, attempts have been made to automatically and continuously measure and indicate the weight of an aircraft, but these devices have often been of complicated construction, expensive to manufacture, of questionable accuracy, and difficult to adapt to existing aircraft.

The present invention is an improvement upon these devices and to this end employs a flexural member which supports the entire weight borne by the supporting structure of vehicle. A Wheatstone bridge network of strain gauges is mounted on the flexural member and is effective to detect the presence of the weight and in response to a resultant signal from the network, a calibrated meter indicates the weight of the vehicle. Thus, the entire weight being supported is borne by the flexural member such that it is sensitive to the entire load and not merely to a value proportional to the load. Also, because the flexural member supports the entire weight being measured, the measuring apparatus can be calibrated prior to installation and accuracy of the apparatus is not compromised by variations in external components which are likely to differ from one vehicle to another. Further advantages of the invention reside in the design and arrangement of the components of the measuring apparatus which provide built-in temperature compensation and protection for the flexural member during periods of overstressing such as would occur if an aircraft equipped with the apparatus experienced a hard landing. Another advantage of the invention resides in the ability of the apparatus to measure only vertical components of the load and to ignore the presence of any other forces acting against the supporting structure.

Accordingly, it is a primary object of the invention to provide new and improved apparatus for measuring the weight of a vehicle.

Another object of the invention is the provision of new and improved weight measuring apparatus which supports the entire weight being measured.

A further object of the invention is the provision of weight measuring apparatus in which a supporting structure includes a flexural member adapted to support the entire weight being measured. A related object is the provision of such apparatus in which the flexural member includes a sleeve on which is mounted a Wheatstone bridge network having strain gauges mounted at spaced longitudinal locations on upper parts of the sleeve and on lower parts of the sleeve. Another related object is the provision of such apparatus in which the strain gauges are so arranged that the bridge network is responsive only to vertical loads in the sleeve. Still another related object is the provision of such apparatus in which the strain gauges are so arranged that the bridge network is unaffected by temperature variations.

Still another object of the invention is the provision of apparatus for measuring the weight of a vehicle provided with a plurality of support structures, each of which includes a flexural member adapted to support the entire weight borne by its associated support structure and operable to detect the presence of the weight, an indicator for indicating the magnitude of the weight, and a device for summing the magnitudes of the weights indicated by each of the indicators. A related object is the provision of such apparatus in which the vehicle is an aircraft and the supporting structure includes landing gear units for the aircraft.

Other and further objects and advantages of the invention will be obvious or will be made apparent in the description which follows, taken together with the accompanying drawings.

In the drawings:

FIGURE 1 is a perspective view of a typical aircraft embodying the present invention;

FIGURE 2 is a detailed section view showing portions of a landing gear modified according to the invention;

FIGURE 3 is a perspective view of a part illustrated in FIGURE 2;

FIGURE 4 is a schematic diagram of a Wheatstone bridge network employed by the invention; and FIGURE 5 is a schematic diagram of an overall system embodying the invention.

Refer now to the drawings and initially to FIGURE 1 which illustrates an aircraft 10 equipped with landing gear units 12, 14, and 16. To measure the weight of the aircraft on the ground, each landing gear unit is provided with a weight sensor 18 (see FIGURE 2), mounted between an axle 20 and a wheel 22 of each unit. For simplicity, it is assumed that the construction of the weight sensor 18 is identical for each of the landing gear units.

The weight sensor 18 includes a flexural member in the form of a sleeve 24 concentric with the axle 20 and provided with radially inwardly directed rims 26 and 28 at its ends. The rims 26 and 28 are suitably apertured so that they are received over and firmly seated on the axle 20, the rim 28 abutting an annular shoulder 30 on the axle 20. Cooperating with the rim 28 and the shoulder 30 to prevent axial movement of the sleeve 24 on the axle 20 is a washer 32 and a nut 34 threadedly engaged with the axle 20 such that when the nut 34 is tightened, the sleeve 24 is held firmly in place on the axle.

The axle 20 and the sleeve 24 are held fixed relative to the aircraft 10 and the wheel 22 is rotatably mounted on the sleeve 24 by means of bearings 36 and 38. Outer races of the bearings 36 and 38 are firmly seated by means of a press fit in suitable recesses 40 and 42 in the wheel 22 while their inner races are press fitted onto an outer surface of the sleeve 24. A suitable retaining ring 44 is fixed to the sleeve 24 adjacent an inner race of the bearing 38. A washer 46 is freely received on the sleeve 24 and when a nut 48 threadedly engaged with the sleeve 24 is tightened against the washer 46, and in turn, the washer 46 against an inner race of the bearing 36, the bearing 38 is held firmly against the retaining ring 44 and the wheel 22 is firmly held against axial movement on the sleeve 24.

Viewing especially FIGURES 2 and 3, strain gauges 50 and 52 are suitably mounted to upper inner surfaces of the sleeve 24 adjacent, respectively, the rims 26 and 28. Similarly, strain gauges 54 and 56 are suitably mounted to lower inner surfaces of the sleeve 24 adjacent, respectively, the rims 26 and 28. A pair of opposed, substantially semi-circular slots 58 and 60 are provided in the sleeve 24 at locations spaced inwardly from the rims 26 and 28. The slots 58 and 60 both terminate at relatively large, substantially oval, apertures 62. Lands 64 are defined between the apertures 62 of the slots 58 and the apertures 62 of the slots 60 and the strain gauges 50, 52, 54, and 56 are respectively mounted on each of these lands. It will be appreciated, when viewing FIGURES 2 and 3, that the entire weight borne by each individual landing gear unit is borne by the sleeve 24 and especially by the lands 64 on the sleeve. The weight on the sleeve causes the lands 64 to be deflected and the strain gauges serve to measure the extent of the deflection.

In FIGURE 4, a Wheatstone bridge network 66 depicts the manner in which the strain gauges 50, 52, 54, and 56 are electrically interconnected. The network 66 is energized by a suitable source of electric potential 68 and any unbalance in flow of electric current through the strain gauges of the network is recorded by an ammeter 70 suitably calibrated to indicate the weight being borne by the sleeve 24. The strain gauges have been suitably placed on the sleeve 24 and suitably interconnected within the network 66 so that the ammeter 70 records only vertical loads which are indicative of the weight of the aircraft 10 and is unaffected by temperature variations.

FIGURE 5 suggests, schematically, an arrangement of networks 66 suitable for measuring the weight of the aircraft 10. A separate network 66 is installed on each of the landing gear units 12, 14, or 16 and each network 66 is effective to indicate the weight borne by its associated unit. The outputs from the three networks 66 are integrated by a suitable summing amplifier 72, the output of which is indicated by a suitably calibrated voltmeter 74.

A factor of safety is provided in the weight sensor 18 to prevent the sleeve 24 from being overstressed as, for example, in the event the aircraft 10 experiences a hard landing. Specifically, inner surfaces of the sleeve 24 include integral annular ridges 76 and 78 generally coplanar with the bearings 36 and 38. Should the aircraft 10 experience a hard landing such that deflection in the sleeve 24 would be excessive and possibly damaging, innermost surfaces of the ridges 76 and 78, which are normally spaced from the axle 20, permit deflection of the sleeve 24 to a predetermined extent after which the ridges bear firmly against the axle and prevent further deflection of the sleeve.

While the invention has been particularly shown and described with reference to a preferred embodiment, it is to be understood by those skilled in the art that the foregoing and other changes in form and details may be made without departing from the spirit and scope of the invention.

What is claimed is:

1. Apparatus for measuring the weight of a vehicle comprising an axle for supporting the vehicle, a sleeve mounted on said axle adapted to support at least part of the weight borne by said axle and operable to detect the presence of said weight and indicating means responsive to operation of said sleeve for indicating the magnitude of said weight.

2. Apparatus as set forth in claim 1 including a wheel and wherein said sleeve is adapted to support said wheel and sensing means on said sleeve for detecting the presence of said weight on said sleeve.

3. Apparatus as set forth in claim 2 wherein said sleeve is mounted on said axle at spaced locations and is adapted to support said wheel at places spaced from said locations.

4. Apparatus as set forth in claim 2 wherein said sleeve is mounted on said axle at spaced locations and is adapted to support said wheel intermediate said locations.

5. Apparatus as set forth in claim 3 wherein said sleeve includes a stop member on an inner surface thereof normally spaced from said axle but adapted to engage said axle in the event of a predetermined load on said sleeve.

6. Apparatus as set forth in claim 3 wherein said sleeve includes an annular ridge on an inner surface thereof normally spaced from said axle but adapted to engage said axle in the event of a predetermined load on said sleeve.

7. Apparatus as set forth in claim 1 including a wheel and a bearing for rotatably supporting said wheel and wherein said sleeve is mounted on said axle at spaced locations intermediate said axle and said bearing whereby said wheel is rotatable on said sleeve, at least one annular ridge on an inner surface of said sleeve and substantially concentric with said bearing, said annular ridge being normally spaced from said axle but adapted to engage said axle in the event of a predetermined load on said sleeve.

8. Apparatus as set forth in claim 2 wherein said sensing means includes a Wheatstone bridge network having first and second strain gauges mounted at spaced longitudinal locations on upper parts of said sleeve and having third and forth strain gauges mounted at spaced longitudinal locations on lower parts of said sleeve.

9. Apparatus as set forth in claim 8 wherein said strain gauges are so arranged that said bridge network is responsive only to vertical load in said sleeve.

10. Apparatus for measuring the weight of a vehicle comprising a plurality of support means, at least one of said support means including an axle, a sleeve mounted on said axle adapted to support at least part of the weight borne by said axle and operable to detect the presence of said weight and indicating means for indicating the magnitude of said weight, and means for summing the magnitudes of said weights indicated by each of said indicating means.

11. Apparatus as set forth in claim 10 wherein said vehicle is an aircraft and said support means include landing gear units for said aircraft.

References Cited

UNITED STATES PATENTS

| 2,443,045 | 6/1948 | Magruder et al. | 177—136 XR |
| 2,453,607 | 11/1948 | Wardle et al. | 177—136 XR |
| 2,470,069 | 5/1949 | Davies | 177—136 XR |
| 2,666,262 | 1/1954 | Ruge | 177—211 XR |
| 2,759,356 | 8/1956 | Blackmon et al. | 177—136 XR |
| 3,194,058 | 7/1965 | Kurkjian | 177—136 XR |
| 3,203,234 | 8/1965 | Westcott et al. | 177—136 XR |
| 3,273,382 | 9/1966 | Fonash | 177—136 XR |
| 3,426,586 | 2/1969 | Kadlec | 177—136 XR |
| 3,432,120 | 3/1969 | Guerrero | 177—136 XR |
| 3,439,761 | 4/1969 | Laimins | 177—211 |

ROBERT S. WARD, JR., Primary Examiner

U.S. Cl. X.R.

177—211